UNITED STATES PATENT OFFICE 2,419,960

PROCESS OF FERMENTING SUGARS BY MIXED YEASTS

David A. Legg, Philadelphia, Pa., assignor to Publicker Industries Inc., a corporation of Pennsylvania No Drawing. Application November 16, 1943, Serial No. 510,489

7 Claims. (Cl. 195—37)

The present invention relates to the alcoholic fermentation of carbohydrates by yeast and it relates more particularly to the fermentation of sugars by mixed yeasts.

An object of the present invention is to provide a more efficient process for the alcoholic yeast fermentation of carbohydrates. Another object of the present invention is to provide a more efficient process for the alcoholic fermentation of sugars. Still another object of the present invention is to provide a process for the fermentation of sugars by mixed yeasts. A further object of the present invention is to provide a process for the efficient alcoholic fermentation of "off-grade" molasses or the like.

Other objects and advantages of the present invention are apparent in the following detailed description and appended claims.

It is well known that strains of *Saccharomyces cerevisiae*, as used in the alcoholic beverage industry and in the industrial alcohol industry, have been selected and classified according to their relative abilities to ferment either a sugar mash such as molasses or a saccharified grain mash.

Thus, in culture collections and in distillery parlance, a yeast will be designated either as a "grain" yeast or as a "molasses" yeast according to its ability to produce consistently the maximum yield of ethanol on either saccharified grain mash or on molasses mash. While a "grain" yeast will ordinarily produce a fair yield of ethanol on a molasses mash and while a "molasses" yeast will ordinarily produce a fair yield of ethanol on a saccharified yeast mash, the former is appreciably better adapted to produce a higher yield of ethanol from saccharified grain and the latter is appreciably better adapted to produce a higher yield of ethanol from molasses, so that, in the past, a "molasses" yeast has not been commercially employed upon a saccharified grain mash and a "grain" yeast has not been employed upon a molasses mash.

I have found that, contrary to what would normally be expected, a mixed culture of "grain" yeast and "molasses" yeast gives better yields of ethanol on molasses mash than does the "molasses" yeast alone.

I have further found that the increase in ethanol yield obtained from a molasses mash by a mixed culture of "grain" yeast and "molasses" is more marked when the molasses mash is made from an "off-grade" molasses, such as ordinarily produces a lower-than-normal yield of ethanol during ordinary plant fermentation with a molasses yeast.

I have found that the increase in ethanol yield obtained by this process is independent of the stage at which the yeasts are mixed, thus, they may conveniently be mixed at the stage in which the culture goes into the first plant yeast tanks.

In the following examples of fermentations carried out according to my present process, "molasses" yeasts are designated by the letter "M" (as for example, M-1 and M-2) while "grain" yeasts are designated by the letter "G" (as for example G-1).

As is well known in the art, the "Brix" mentioned in the examples indicates the density of the mash as determined by a Brix hydrometer at a standard temperature and is an indication of the concentration of sugar in the mash. Since the sugar is converted to the relatively less dense alcohol during the fermentation, the extent of drop in Brix reading is an indication of the efficiency of the fermentation.

EXAMPLE 1

Mashes were made up with suitable nutrients from invert molasses containing 78% of total sugar. The initial concentrations of sugar were, in this case, relatively low and, therefore, favorable to good yields. Samples (two specimens for each condition) of the molasses mash were inoculated with a molasses yeast, a grain yeast and a mixture of equal parts of a molasses yeast and grain yeast respectively. After 72 hours, fermentations were complete and the results shown in Table I were obtained. Efficiencies are calculated on the sugar present in the invert molasses and in the yeast inoculum.

Table I

| Yeast Used | Approx. Initial Brix of final mash | Percent of Total Invert Sugar in Mash | Efficiency | |
|---|---|---|---|---|
| | | | Pounds Invert per proof gal. alcohol | Percent of theory |
| M-1 10% | 15° | 15.1 | 7.65 | 89.5 |
| G-1 10% | 15° | 15.1 | 7.78 | 88.0 |
| M-1+G-1 (5% of each) | 15° | 15.1 | 7.53 | 90.8 |
| M-1 10% | 14° | 13.5 | 7.71 | 88.9 |
| G-1 10% | 14° | 13.5 | 7.90 | 87.2 |
| M-1+G-1 (5% of each) | 14° | 13.5 | 7.46 | 91.7 |
| M-1 10% | 12.7° | 12.0 | 7.67 | 89.2 |
| G-1 10% | 12.7° | 12.0 | 7.53 | 91.0 |
| M-1+G-1 (5% of each) | 12.7° | 12.0 | 7.37 | 93.0 |

It can be seen that, in each case, the mixed yeast gave a greater efficiency (that is, less pounds of invert sugar required to produce a proof gallon of alcohol) than did either yeast alone.

EXAMPLE 2

In this example, sugar concentrations comparable to those in plant practice were used, namely 18 to 19%; these higher concentrations being less favorable to good yields than the concentrations employed in Example 1. The main mash was composed of "invert molasses" with suitable nutrients and the inoculum consisted respectively of 10% by volume of a blackstrap molasses culture of molasses yeast M-1 and of 5% of each of grain yeast culture G-1 and molasses yeast culture M-1. Two-liter flasks were fermented under each condition. The results obtained are shown in Table II.

*Table II*

| Yeast Inoculum | Concentration of sugar as invert in final mash, gms./100 ml. | Percent by volume of ethanol | Efficiency | |
|---|---|---|---|---|
| | | | Pounds of invert per proof gallon | Percent of theory |
| M-1 10% | 18.6 | 9.78 | 7.94 | 86.2 |
| G-1 5%, M-1 5% | 18.4 | 10.36 | 7.40 | 92.4 |
| M-1 10% | 16.7 | 9.21 | 7.55 | 90.8 |
| M-1+G-1 (5% of each) | 16.7 | 9.46 | 7.42 | 91.8 |
| M-1 10% | 18.5 | 9.62 | 8.04 | 85.2 |
| M-1+G-1 (5% of each) | 18.4 | 10.11 | 7.61 | 90.0 |

Example 3

In this example, two molasses yeasts M-1 and M-2 were compared with mixtures of each with a grain yeast G-1. The mash was composed of 19 Brix invert molasses solution with appropriate nutrients and the inoculum consisted respectively of 10% of blackstrap cultures of the individual yeasts or of 5% of each of the cultures in the cases of mixed inoculum. The results obtained are shown in Table III.

*Table III*

| Yeast Inoculum | Concentration of sugar as invert in final mash, grams/100 ml. | Percent by volume of ethanol | Efficiency | |
|---|---|---|---|---|
| | | | Pounds of invert per proof gallon alcohol | Percent of theory |
| M-1 10% | 18.5 | 10.03 | 7.73 | 88.8 |
| M-1+G-1 (5% of each) | 18.5 | 10.20 | 7.59 | 90.2 |
| M-2 10% | 18.45 | 10.11 | 7.64 | 89.6 |
| M-2 5%, G-1 5% | 18.45 | 10.2 | 7.56 | 90.6 |
| G-1 10% | 18.6 | 9.62 | 8.06 | 85.0 |

Example 4

This example was to determine whether the yeasts should be mixed at the time of inoculation of the final mash or whether the grain and molasses yeasts can be grown together in the stages leading up to the final yeast mash. In this case, four flasks were used under each condition and the average results obtained are shown in Table IV.

*Table IV*

| Yeast Inoculum | Concentration of sugar as invert in final mash, gms./100 ml. | Percent by volume of ethanol | Efficiency | |
|---|---|---|---|---|
| | | | Pounds of invert per proof gallon | Percent of theory |
| M-1 10% | 18.7 | 9.5 | 8.23 | 83.2 |
| M-1+G-1 (5% of each) grown together in last 2 yeast stages | 18.7 | 10.03 | 7.80 | 87.8 |
| M-1+G-1 (5% of each) mixed at time of inoculation of final mash | 18.7 | 9.95 | 7.88 | 87.0 |

In this experiment, the blackstrap used for the inoculum was low in nitrogen and the concentrations of sugar in the final mash were higher than usual; all efficiencies being somewhat lower than normal. Nevertheless, the mixed cultures show markedly improved results over the molasses yeast alone. In this case also, the mixed culture gave a higher efficiency when the molasses and grain yeasts were grown together in the last two yeast stages than when the molasses and grain yeasts were mixed at the time of inoculation of the final mash.

Example 5

In this example, a sample of "off-grade" blackstrap molasses, which had failed to give better than 82–84% efficiency in the plant using M-1 molasses yeast, was tested with a mixture of M-1 and G-1 yeasts, with the results shown in Table V.

*Table V*

| Yeast Inoculum | Initial Brix of final mash | Efficiency | |
|---|---|---|---|
| | | Pounds of invert per proof gallon | Percent of theory |
| M-1 10% | 18.35 | 8.30 | 82.48 |
| M-1 10% | [1] 18.35 | 8.30 | 82.48 |
| M-1+G-1 (5% of each) mixed at time of inoculation | [2] 19.8 | 7.94 | 86.2 |
| M-1+G-1 (5% of each) mixed during yeast stages, Plant scale test | 18–19 | 7.8 to 7.9 | 86–87.5 |
| M-1 alone, Plant average | 18–19 | 8.2 to 8.4 | 82–84 |

[1] Phosphate and Ammonium Sulfate added.
[2] No salts added.

It can be seen that the increase in yield obtained by using mixed molasses and grain yeasts in place of molasses yeast alone is much more marked on the "off grade" molasses than on a normal molasses mash. Indeed, in the case of such "off grade" molasses, the use of the mixed grain and molasses yeasts increases the yield sufficiently to make the fermentation commercially practical, whereas the yield obtained using molasses yeast alone is so low that the fermentation of such "off grade" blackstrap could be conducted only at a loss.

Since it is by no means uncommon to find batches of molasses which are "off grade" and which normally produce lower-than-normal yields of alcohol in the plant, it can be seen that my present process is of great importance in increasing the efficiency of the plant by increasing the total yield and by greatly reducing the number of batches which are fermented at a loss due to lower-than-normal yield of alcohol.

The present process is applicable to so-called invert or high test molasses as well as to blackstrap or other forms of molasses.

The reason why the mixture of a grain yeast and a molasses yeast gives a greater yield of ethanol from a molasses mash than does a molasses yeast alone is not entirely clear and may be the result of one or more of many factors, such as for example, the greater resistance of one strain of yeast to a toxic constituent or virus either present in the molasses or produced by contaminants during fermentation, the greater power of one yeast to ferment certain polysaccharides which may be present in molasses or which may be produced during the fermentation of molasses by a re-polymerization of sugar, the lower or different nitrogen requirement of one strain, etc.

While the use of a mixture of equal parts of molasses yeast and grain yeast has thus far been found to constitute a preferred embodiment of the present invention, the present invention is not limited to this proportion. Thus, it has been found that the use of mixtures of molasses yeast and grain yeast in which either yeast preponderates results in greater yields of alcohol from a molasses mash than is the case with a molasses yeast alone.

As used in the appended claims, the expression "molasses yeast" refers to a yeast which is normally more efficient in fermenting a molasses or other sugar mash than a saccharified grain mash, while the expression "grain yeast" refers to a yeast which is normally more efficient in fermenting a saccharified grain mash than a molasses mash.

The present invention may be carried out in other specific ways without departing from the spirit or essential attributes thereof, and it is therefore desired that the above-described forms be considered in all respects as illustrative and not restrictive, reference being had to the appended claims rather than to the foregoing description to indicate the scope of the invention.

Having thus described the invention, what is hereby claimed as new and desired to be secured by Letters Patent is:

1. A process for producing ethanol which comprises fermenting a natural sugar mash with a mixed culture of molasses yeast and grain yeast.

2. A process for producing ethanol which comprises fermenting a molasses mash with a mixed culture of molasses yeast and grain yeast.

3. A process for producing ethanol which comprises fermenting a natural sugar mash with a mixed culture formed by growing a molasses yeast and a grain yeast together.

4. A process for producing ethanol which comprises fermenting a molasses mash with a mixed culture formed by growing a molasses yeast and a grain yeast together, through the last two stages of propagation.

5. A process for fermenting a natural sugar mash which otherwise gives a low yield of ethanol, comprising inoculating said mash with a mixed culture formed by growth of a molasses yeast and a grain yeast together, through the last two stages of propagation, and causing the fermentation to go to completion, thereby to obtain an ethanol yield substantially higher than that obtainable by use of molasses yeast alone.

6. A process for producing ethanol which comprises forming an aqueous molasses mash containing approximately 10 to 20% sugar, inoculating the mash with approximately 10% of a yeast culture containing approximately equal parts of molasses yeast and grain yeast, and causing the fermentation to go to completion.

7. A process for fermenting an off-grade molasses which otherwise gives low yields of ethanol which comprises forming an aqueous mash of said molasses, said mash containing approximately 10 to 20% sugar, inoculating said mash with approximately 10% of a yeast culture containing approximately equal parts of molasses yeast and grain yeast, and causing the fermentation to go to completion, thereby to obtain an ethanol yield substantially higher than that obtainable by use of molasses yeast alone.

DAVID A. LEGG.

REFERENCES CITED

The following references are of record in the file of this patent:

UNITED STATES PATENTS

| Number | Name | Date |
|---|---|---|
| 751,990 | McGlashan | Feb. 9, 1904 |
| 2,122,939 | Hansen | July 5, 1939 |
| 1,677,529 | Pollak | July 17, 1938 |

FOREIGN PATENTS

| Number | Country | Date |
|---|---|---|
| 347,542 | British | 1930 |
| 454,766 | British | 1936 |